Sept. 21, 1926.  
W. F. ALBRECHT  
FAUCET  
Filed Nov. 20, 1925  
1,600,918

William F. Albrecht,
INVENTOR

BY Victor J. Evans
ATTORNEY

WITNESS:

Patented Sept. 21, 1926.

1,600,918

UNITED STATES PATENT OFFICE.

WILLIAM F. ALBRECHT, OF SALT LAKE CITY, UTAH.

FAUCET.

Application filed November 20, 1925. Serial No. 70,394.

This invention relates to improvements in faucets, the general object of the invention being to make the working parts removable, so that repairs can be easily and quickly made.

Another object of the invention is to so form the parts that the washer is carried by one of the removable portions so that a new washer can be put in place by removing the broken parts and the old washer can be separated from its seat by moving one of the removed parts in relation to the other.

A further object of the invention is to so form the parts that the washer will be practically enclosed by walls of metal when the faucet is closed.

Another object of the invention is to so arrange the parts that the washer which acts in conjunction with the valve member to prevent the flow of water through the faucet also acts as a gasket for preventing leakage between the working parts and the partition in the body of the faucet.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
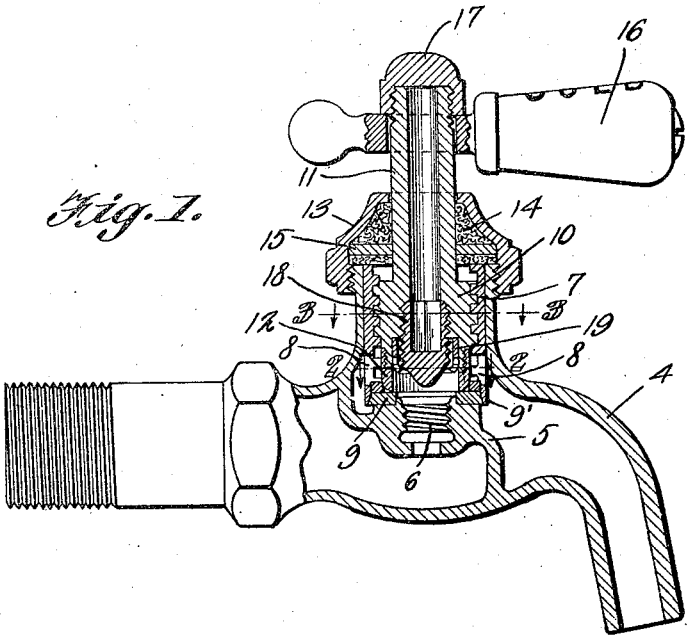
Figure 1 is a longitudinal sectional view through the improved faucet.
Figure 2:
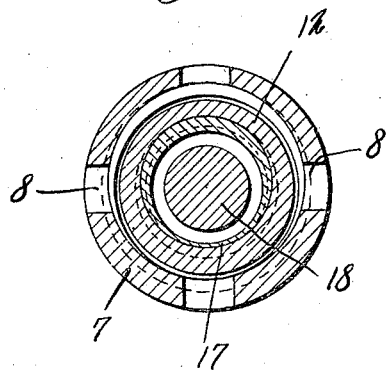
Figure 2 is a section on line 2—2 of Figure 1.
Figure 3:
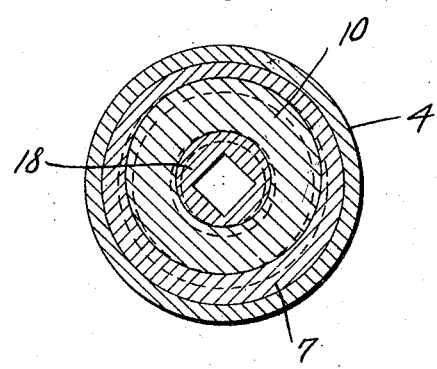

Figure 3 is a section on line 3—3 of Figure 1.

In these views, 4 indicates the body of the faucet which is provided with the usual partition 5, which has the port 6 therein for the passage of the water from one portion of the body to the other, this port having its walls threaded, as shown. An internally threaded barrel 7 snugly fits in the cylindrical extension of the body, said barrel having the holes 8 adjacent its lower end and a flange 9' which forms, with the lower portion of the barrel, a seat for the washer 9 which engages a seat formed on the top of the partition when the barrel is in place. The head 10 of the valve stem 11 is threaded to engage the threads of the barrel, and a ring-shaped valve member 12 is threaded to the lower part of the head and has its beveled lower end arranged to engage the washer 9 when the valve is in closed position. As will be seen, when the parts are in this position, the holes 8 will be closed by the member 12, so that water cannot pass through the faucet. A water-tight junction is formed between the beveled end of the member 12 and the washer 9. A gasket may be placed between the member 12 and the head 10 to make a water-tight joint. A cap 13 screws on the top of the cylindrical extension and carries the packing 14 and the washers 15 for making a water-tight joint. The usual handle 16 is connected with the valve stem by the nut 17.

From the foregoing, it will be seen that when the stem is turned by the handle, the head 10 will rotate in the barrel 7 and due to its threaded connection with said barrel, it will be raised or lowered according to the direction of rotation. Thus the member 12 will be moved to uncover or cover the openings 8. When the member uncovers the openings, water can flow from one portion of the body to the other through the port 6 and the holes 8. When it is desired to remove the parts for repairs or the like, it is simply necessary to take off the cap 13 and pull the parts from the body, the barrel 7 sliding out of the body and bringing the washer 9 with it. Then by holding the barrel in one hand and turning the stem with the other, the member 12 can be made to force the washer 9 out of the barrel, so that a new washer can be put in place. As will be seen, from Figure 1, when the faucet is closed, the washer is practically surrounded by the metal parts. Attention is also called to the fact that the washer does not move, but the member 12 moves in the opening and closing movement of the valve.

A plug 18 is threaded in the head 10 and has a socket adapted to receive a key or other tool which is passed through the stem 11, which is made hollow for this purpose, so that the plug can be threaded in the port 6 to close the same so that the working parts can be removed from the body without the escape of water and without turning off the water in the system.

A spring sleeve 19, having its lower end tapered and split, is arranged in the head 10 and acts to conduct the plug 18 in its movement from the head to the port 6, as these parts are so arranged that the plug will leave the threads in the head before it engages the threads in the port 6 so that some means must be provided to support the plug after it leaves the head and before it reaches the port. This will prevent injury to the threads or "cross threading".

This key forms the subject matter of an application filed concurrent with this application.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A faucet of the class described, comprising a body having a partition therein provided with a port and a seat at its upper part, a barrel removably fitting in the body and having a flange spaced from its lower end and holes in the barrel above the flange, a washer carried by the barrel and engaging the flange thereof and resting on the seat of the partition, the interior of the barrel being threaded, a valve head threaded to engage the threads in the barrel and having a ring shaped member at its lower end for covering the holes in the barrel and engaging the washer, a stem connected with the head, a handle on the stem and a cap encircling the stem and threaded to a part of the body for removably holding the parts in position.

2. A faucet of the class described, comprising a body having a partition therein provided with a port, a barrel removably fitting in a part of the body and having holes in its lower end, an internal flange on the barrel spaced from the lower end, a washer in the lower end of the barrel engaging the flange and resting upon a part of the partition, the interior of the barrel being threaded, a valve head threaded to engage the said threads, a ring-shaped valve member threaded to the head for closing the holes in the barrel and having a beveled end for engaging the washer, a stem connected with the head, a handle on the stem and a cap through which the stem passes and threaded to the body for holding the parts in place.

3. A faucet, comprising a body having a partition therein with a threaded opening, a barrel removably seated in the body and having holes in its lower end, a washer removably located in the inner end of the barrel and engaging a portion of the partition, a valve head threaded to the barrel and having a valve member at its lower end for closing the holes in the barrel and engaging the washer, a tubular stem on the head, a socketed plug in the head adapted to have its socket engaged by a tool passed through the stem so that the plug can be moved from the head and placed in engagement with the hole in the partition, a handle connected with the stem and a cap through which the stem passes and threaded to a part of the body for holding the parts in position.

In testimony whereof I affix my signature.

WILLIAM F. ALBRECHT.